United States Patent
Loewe et al.

(10) Patent No.: US 9,410,533 B2
(45) Date of Patent: Aug. 9, 2016

(54) WIND TURBINE ROTOR BLADE HAVING A HEATING ELEMENT AND A METHOD OF MAKING THE SAME

(71) Applicant: Nordex Energy GmbH, Hamburg (DE)

(72) Inventors: Astrid Loewe, Hamburg (DE); Oskar Renschler, Delingsdorf (DE); Philipp Rindt, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 854 days.

(21) Appl. No.: 13/667,989

(22) Filed: Nov. 2, 2012

(65) Prior Publication Data

US 2013/0136598 A1 May 30, 2013

(30) Foreign Application Priority Data

Nov. 24, 2011 (EP) .................... 11009302

(51) Int. Cl.
| | |
|---|---|
| *F03D 11/00* | (2006.01) |
| *F03D 1/00* | (2006.01) |
| *B29D 99/00* | (2010.01) |
| *B29C 70/88* | (2006.01) |
| *B29C 70/44* | (2006.01) |
| *B29C 70/86* | (2006.01) |

(52) U.S. Cl.
CPC .......... *F03D 11/0025* (2013.01); *B29C 70/443* (2013.01); *B29C 70/86* (2013.01); *B29C 70/882* (2013.01); *B29D 99/0025* (2013.01); *B29D 99/0028* (2013.01); *F03D 1/001* (2013.01); *F05B 2280/2006* (2013.01); *Y02E 10/722* (2013.01); *Y02P 70/523* (2015.11); *Y10T 29/49169* (2015.01); *Y10T 29/49712* (2015.01)

(58) Field of Classification Search
CPC ... F03D 1/0025; F03D 1/001; F03D 11/0025; B29D 99/0025; B29D 99/0028; B29D 70/86; B29D 70/443; B29D 70/882; F05B 2280/2006; B29C 70/882; B29C 70/443; B29C 70/86
See application file for complete search history.

(56) References Cited

U.S. PATENT DOCUMENTS

| | | | | |
|---|---|---|---|---|
| 4,822,950 | A | * 4/1989 | Schmitt | ............ 174/36 |
| 5,780,793 | A | * 7/1998 | Buchholz | ....... E05F 15/44 |
| | | | | 200/262 |
| 5,947,418 | A | 9/1999 | Bessiere et al. | |
| 6,145,787 | A | * 11/2000 | Rolls | ........... 244/134 R |
| 6,612,810 | B1 | 9/2003 | Olsen et al. | |
| 7,157,663 | B1 | 1/2007 | Kismarton | |

FOREIGN PATENT DOCUMENTS

| | | |
|---|---|---|
| GB | 2 121 745 A | 1/1984 |
| WO | WO 2011/127995 A1 | 10/2011 |
| WO | WO 2011/127997 A1 | 10/2011 |

* cited by examiner

*Primary Examiner* — Richard Edgar
*Assistant Examiner* — Brian P Wolcott
(74) *Attorney, Agent, or Firm* — Walter Ottesen, P.A.

(57) ABSTRACT

The invention relates to a wind turbine rotor blade having a blade root, a blade tip, two interconnected rotor blade half shells, which include a fiber-reinforced plastics material, and an electrical heating element, which is arranged on an outer side of the rotor blade and has a blade root end and a blade tip end, wherein the blade tip end is connected via an electrical line leading to the blade root and at least a first segment of the electrical line, which is arranged on an inner side of one of the rotor blade half shells, is made of a carbon fiber material. Further, the present invention relates to a method for making a wind turbine rotor blade having an electrical heating element.

11 Claims, 4 Drawing Sheets

WIND TURBINE ROTOR BLADE HAVING A HEATING ELEMENT AND A METHOD OF MAKING THE SAME

CROSS REFERENCE TO RELATED APPLICATION

This application claims priority of European patent application no. 11009302.8, filed Nov. 24, 2011, the entire content of which is incorporated herein by reference.

FIELD OF THE INVENTION

The present invention relates to a wind turbine rotor blade having a blade root, a blade tips, two interconnected rotor blade half shells, which include a fiber-reinforced plastics material, and an electrical heating element. The heating element is arranged on an outer side of the rotor blade and has a blade root end and a blade tip end and the blade tip end is connected via an electrical line leading to the blade root. Furthermore, the invention relates to a method of making such a wind turbine rotor blade.

BACKGROUND OF THE INVENTION

Wind turbines are preferably set up at locations with high and as constant as possible wind speeds. Often there are low temperatures at these locations, so that ice can form on the rotor blades of a wind turbine under certain weather conditions. The formation of ice on the rotor blades has a negative impact on the operation of the wind turbine. For this reason, ice warning systems or de-icing systems are often used in cold regions.

An ice warning system ensures that the wind turbine is preventatively shut down in corresponding weather conditions. Losses of yield are a consequence thereof.

A de-icing system prevents ice crystals from forming on the rotor blades. As a result, a de-icing system enables the wind turbine to remain in operation and allows the losses of yield to be reduced or even avoided.

From the state of the art it is known to install heating elements on the outer surface of the rotor blades of a wind turbine. Heating elements are preferably installed in regions near to the middle of the blade up to the rotor blade tip where the formation of ice crystals negatively impacts the aerodynamic effectiveness of the wind turbine rotor blades and is thus disruptive. Such heating elements are connected to the wind turbine via electrical lines which lead from the heating elements to the rotor blade root, wherein the electrical lines consist of conventional cables.

Conventional cables are disadvantageous in that they can be damaged over time by the movement and continuous shaking/vibration of the wind turbine rotor blades. The repair of such damaged cables in a wind turbine is very complex and in particular is almost impossible close to the rotor blade tip because of the small space there.

SUMMARY OF THE INVENTION

Based on the above, it is the object of the invention to provide a wind turbine rotor blade having a heating element which requires fewer repairs.

The present invention relates to a wind turbine rotor blade having a blade root, a blade tip, two interconnected rotor blade half shells, which include a fiber-reinforced plastics material, and an electrical heating element, which is arranged on an outer side of the rotor blade and has a blade root end and a blade tip end, wherein the blade tip end is connected via an electrical line leading to the blade root and wherein at least a first segment of the electrical line, which is arranged on an inner side of one of the rotor blade half shells, is made of a carbon fiber material.

The two interconnected rotor blade half shells include a fiber-reinforced plastics material, such as for example fiberglass-reinforced plastic.

The electrical heating element is arranged on an outer side of the wind turbine rotor blade and has a blade root end and a blade tip end. The heating element is arranged in such a manner that it can heat a region of the wind turbine rotor blade during operation in order to thereby prevent the formation of ice crystals or the deposition of larger amounts of ice. The heating element can, for example, include a resistance wire, for example made of copper or other suitable metals or a metal alloy such as constantan, manganin, isotan or a similar suitable alloy. Alternatively, the heating element can be made of carbon-fiber-reinforced plastic (CRP).

The blade tip end of the electrical heating element is connected to an electrical energy source via an electrical line leading to the blade root. The electrical energy source can, in particular, be arranged in a nacelle of the wind turbine and be connected to the rotor and a blade root end of the electrical line via a slip ring. In this case, the electrical line is led from an outer side to an inner side of the wind turbine rotor blade. The blade root end of the heating element can be connected via a further electrical line, which is likewise led to the blade root and can be arranged entirely or partially on an inner side of the wind turbine rotor blade.

At least a first segment of the electrical line that is arranged on an inner side of one of the rotor blade half shells is made of a carbon fiber material. The carbon fiber material consists substantially of carbon fibers. It can, in particular, be a woven fabric or some other textile material, in particular in strip form. It can be a fiber material that is intended or suitable for producing carbon-fiber-reinforced plastics. The carbon fiber material can be in a flat form and have a thickness of, for example, 1.0 mm or less or 0.5 mm or less or only 0.25 mm or less. An additional heating effect produced by the carbon fiber material is a desired side-effect under some circumstances.

The first segment which includes the carbon fiber material may be integrated in the laminate of the rotor blade half shell or be adhesively bonded to the inner side of the wind turbine rotor blade. It is permanently fixed to the rotor blade half shell and cannot slip when there is movement of the wind turbine rotor blade. As a result, the lifetime of this segment of the electrical line is increased, even under severe vibrations and bending of the rotor blade. Contributing to this is the fact that the carbon fiber material has similar elasticity properties as the material of the rotor blade half shell. The carbon fiber material can therefore follow the deformations of the rotor blade half shell that occur during operation, without itself being damaged or becoming detached from the rotor blade half shell.

According to one embodiment, the first segment extends in the direction of the blade root up to a longitudinal position of the wind turbine rotor blade at which the profile thickness of the wind turbine rotor blade is at least 20 cm. The profile thickness of the wind turbine rotor blade there may also be at least 30 cm, 50 cm, 60 cm, 70 cm, 80 cm, 90 cm or 1 m. The first segment preferably extends to a profile thickness in which the service personnel can comfortably inspect the connection of the first segment to an adjoining segment of the electrical line. This has the advantage that inspections of the installation and necessary repairs become less involved, and consequently less costly, since the service personnel can access this connection point without any problem.

According to one embodiment, a second segment of the electrical line is arranged on the outer side of the rotor blade and is made of a carbon fiber material; a region of the second segment contacts the blade tip end of the heating element. The contacting establishes a direct electrical contact. The second segment and the heating element can, for example, adjoin one another, so that a direct electrical contact is produced. The second segment and the heating element preferably overlap in a region. In the overlapping region, the heating element lies on the second segment and/or the second segment lies on the heating element. Alternatively, means for improving the conductivity, such as for example an electrically conducting woven fabric or metal plates or metal wires or metal cuttings, can be arranged between the second segment and the heating element.

According to one embodiment, a region of the second segment is led around the heating element, so chat it contacts an underside and a top side of the heating element. The heating element is preferably completely wrapped around by the second segment in the overlapping region, so that the underside and the top side of the heating element are covered by the second segment in the overlapping region.

According to one embodiment, the first segment and the second segment are formed by a continuous strip of material, which runs from the inner side to the outer side. For example, the strip of material may be led from the inside to the outside at the trailing edge of the rotor blade between the two rotor blade half shells or through a clearance in a wall of one of the rotor blade half shells. Alternatively, the first and second segments can consist of two strips of material that are interconnected.

According to one embodiment, the strip of material is redirected over an edge, preferably over the trailing edge, of one of the rotor blade half shells. Further, the strip of material can run on the outer side substantially in the direction of the depth of the profile of the wind turbine rotor blade, or else at an angle of between 0° and 90° thereto.

According to one embodiment, the carbon fiber material is embedded in a polymer matrix. Thermosetting materials, such as for example epoxy resin, can be used as the basis of the plastic matrix. This embedding of the carbon fiber material has the advantage that the carbon fiber material is permanently fixed, cannot slip and also cannot be damaged by shaking/vibration.

According to one embodiment, the carbon fiber material and/or the heating element is coated with a protective layer. The protective layer may be an electrically insulating polymer or some other fiber composite material. The protective layer preferably is a fiberglass-reinforced plastic.

According to one embodiment, the first segment and/or the second segment is laminated or adhesively bonded to one of the rotor blade half shells. In the case of lamination, the plastic-impregnated first or second segment and one of the rotor blade half shells are firmly bonded to one another. In particular, the carbon fiber material of the first segment and/or of the second segment can be placed dry on the relevant rotor blade half shell and subsequently impregnated with a liquid plastics material, for example with a roller or roll. It can also be applied to the half shell in the already impregnated state. Similarly, the heating element can be laminated or adhesively bonded on an outer side of the rotor blade half shells, so that these elements of the wind turbine rotor blade are likewise easily and permanently fixed and protected from slipping, and consequently cannot be damaged by movement.

According to one embodiment, at least a second heating element is arranged adjacent to the one heating element on the outer side of the wind turbine rotor blade. The heating elements can be located on one side of the rotor blade. Alternatively, at least one heating element is located on each side of the rotor blade. The two heating elements are arranged in such a manner that the second segment contacts an underside and a top side of the heating elements. For example, a region of the second segment can be led around both heating elements. Similarly, the two heating elements can overlap in a region, in which the second segment is led around both heating elements. It is similarly conceivable that the two heating elements lengthwise form an acute angle, so that they likewise include an overlapping region around which the second segment is led.

According to one embodiment, the heating element or heating elements has/have a higher ohmic resistance per length than the carbon fiber material of the first and/or second segment. Furthermore, the heating elements can have ohmic resistances per length that are different from one another; the emitted heat is influenced by the ohmic resistance per length. Thus, the heating capacity in the region of the two heating elements can be specifically configured differently without involved/costly electrical control measures.

According to one embodiment, a metallic conductor, which interconnects the first segment and the second segment, is arranged in a wall of one of the rotor blade half shells. The metallic conductor can be configured as a solid block, in particular as a pin 16 or as a disc-shaped body 15, or as some other conductor of any desired form. The metallic conductor serves as a transition of the electrical line from the inner side to the outer side of the rotor blade half shell or as a connection between the first segment and the second segment.

Furthermore, the invention relates to a method of making a wind turbine rotor blade having an electrical heating element, the method including the following steps:
 (a) producing a rotor blade half shell, which includes a fiber-reinforced plastics material;
 (b) arranging an electrical line, which leads from an outer side of the rotor blade half shell to a blade root, wherein at least a first segment of the electrical line is made of a carbon fiber material and is arranged on an inner side of the rotor blade half shell;
 (c) connecting the rotor blade half shell to a further rotor blade half shell, which includes a fiber-reinforced plastics material;
 (d) arranging an electrical heating element on an outer side of the wind turbine rotor blade, wherein the heating element has a blade root end and a blade tip end; and,
 (e) establishing an electrical contact between the blade tip end of the heating element and the electrical line.

The above individual method steps can also be carried out in a different sequence.

For producing a rotor blade half shell, a fiber material is placed in a mold or the mold is lined therewith. Subsequently, the mold lined with the fiber material is prepared for a vacuum infusion process, that is, in particular is closed in an airtight manner, for instance with a vacuum film. In the vacuum infusion, a negative pressure is generated in the mold and liquid plastic is introduced into the mold, whereby the fiber material arranged in the mold is impregnated with the liquid plastic. After curing, the rotor blade half shell substantially has its final form.

The arranging of an electrical line that leads from an outer side of the rotor blade half shell to a blade root can take place before or after application of the vacuum infusion process, that is, before or after the curing of the rotor blade half shell.

The at least one, first segment of the electrical line which is made of a carbon fiber material is arranged on an inner side of the rotor blade half shell.

The rotor blade half shell produced is subsequently connected to a further rotor blade half shell, which also includes a fiber-reinforced plastics material, in particular, by adhesive bonding.

The arranging of the electrical heating element on an outer side of the wind turbine rotor blade can take place before or after the curing of the rotor blade half shell. The heating element has a blade root end and a blade tip end.

Preferably, an electrical contact is established between the blade tip end of the heating element and the electrical line.

According to a further embodiment of the method, the rotor blade half shell is produced in a mold in a vacuum infusion process and the heating element and/or the first segment is placed in the mold together with further fiber materials of the rotor blade half shells and impregnated with a liquid plastics material. The placement in the mold of the heating element and/or the first segment together with the fiber materials of the rotor blade half shell allows the heating element and/or the first segment to be firmly connected to the rotor blade half shell. The damage caused by shaking/vibration of the finished wind turbine rotor blade during operation can thereby be avoided.

According to a further embodiment of the method, the rotor blade half shell is prefabricated in a vacuum infusion process and the heating element and/or the first segment is placed onto the cured rotor blade half shell and impregnated with a liquid plastics material.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
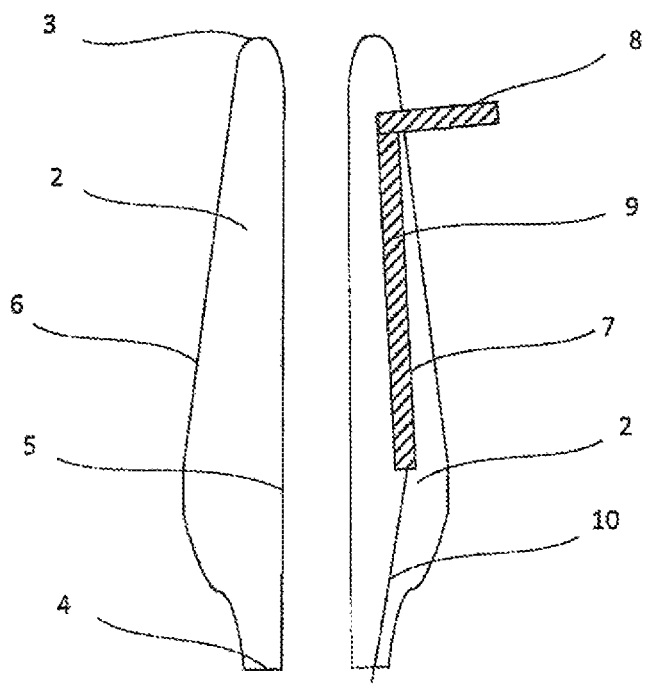
FIG. 1 shows a view of two rotor blade half shells with a carbon fiber material.

FIG. 1 shows the inner sides of two not yet interconnected rotor blade half shells 2 lying next to one another, each having a blade tip 3, a leading edge 5, a blade root 4 and a trailing edge 6. An electrically conductive carbon fiber material 9 has a first segment 7, which is arranged on the inner side of the rotor blade half shell 2, and a second segment 8, which leads out from the inner side of the rotor blade half shell 2 and, in the state shown in FIG. 1, projects outward beyond the rotor blade half shell 2. The first segment 7 runs parallel to the leading edge 5. As shown in FIG. 1, the carbon fiber material 9 is configured as one piece, in the form of a strip of material.

Also shown in FIG. 1 is an electrical line 10, which is connected to a blade root end of the first segment 7. The electrical line 10 serves for the connection to an electrical energy source within a nacelle (not shown) of the wind turbine and can, for example, consist of a conventional cable.

The first segment 7 extends in the direction of the blade root 4 up to a longitudinal position of the wind turbine rotor blade 1 at which the profile thickness d of the wind turbine rotor blade 1 is at least 20 cm.

Figure 2:
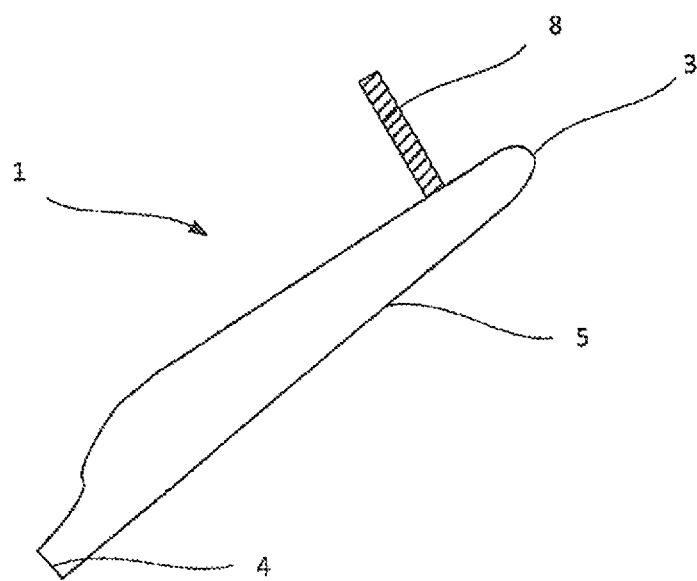
FIG. 2 shows a view of the rotor blade with interconnected rotor blade half shells according to FIG. 1.

FIG. 2 shows a wind turbine rotor blade 1 after the two rotor blade half shells 2 according to FIG. 1 have been adhesively bonded to one another. The second segment 8 of the carbon fiber material 9 leads to the outside at the trailing edge 6 near the blade tip 3 between the rotor blade half shells 2.

The production of the rotor blade is described on the basis of FIGS. 3a to 3e. A number of method steps are schematically shown in FIGS. 3a to 3e. FIGS. 3a to 3e show the outer side of the regions on the blade tip end of the rotor blade half shells. For the purposes of illustration, the half shells are arranged next to one another as in FIG. 1. The regions near the blade root of the rotor blade half shells 2 are not shown. In the production of the wind turbine rotor blade 1 according to FIGS. 3a to 3e, the rotor blade half shells 2 have actually already been adhesively bonded to one another.

Figure 3A:
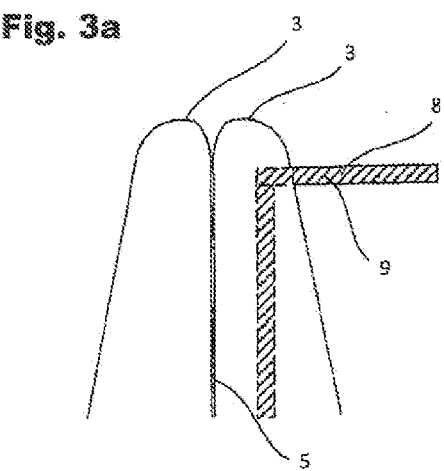
FIGS. 3a to 3e show a view of the installation sequence of the heating element and a carbon fiber material.
Figure 3B:
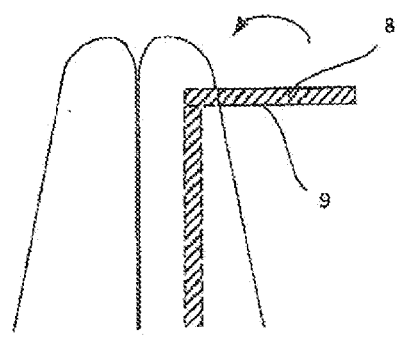
Figure 3C:
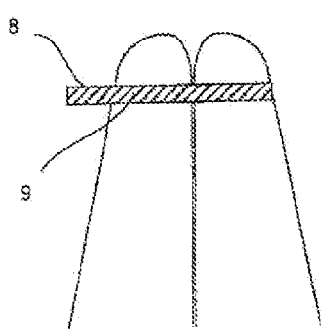

According to FIG. 3a, the second segment 8 of the carbon fiber material 9 is directed outward beyond the rotor blade half shell 2. In FIGS. 3b and 3c, the protruding second segment 8 of the carbon fiber material 9 near the blade tip 3 is led around the outer side of the wind turbine rotor blade 1 (indicated in FIG. 3b by the arrow).

Figure 3D:
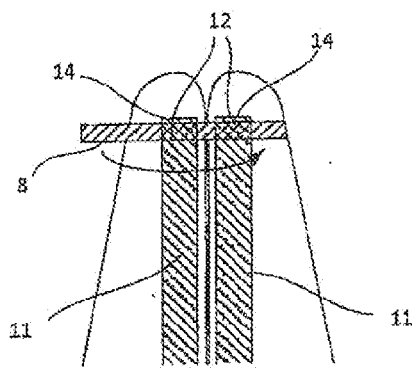
Figure 3E:
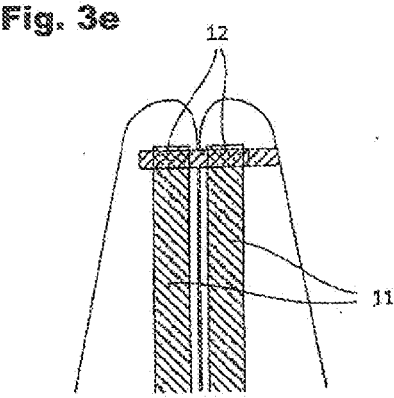

According to FIG. 3d, two heating elements 11 are arranged next to one another parallel to the leading edge 5 on the outer side of corresponding ones of the rotor blade half shells 2, so that two overlapping regions 12 are produced, each being between a blade tip end 14 of a heating element 11 and the second segment 8 of the fiber-reinforced plastics material 9. According to FIG. 3e, the second segment 8 of the fiber-reinforced plastics material 9 is led for a second time around the outer side over the heating elements 11, so that in each case a heating element 11 and the second segment 8 are arranged one over the other for a second time in the overlapping regions 12.

In this way, the second segment 8 contacts both an underside and a top side of each heating element 11.

Figure 4:
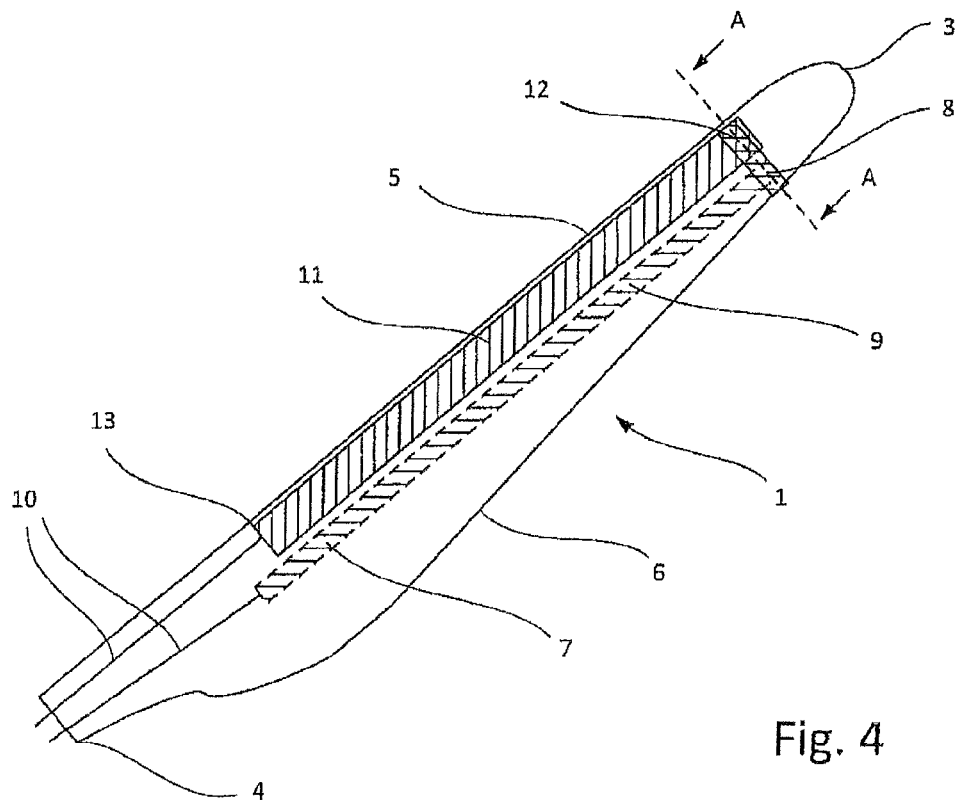
FIG. 4 shows a view of a completely installed heating element and a carbon fiber material.

FIG. 4 shows an outer view of a wind turbine rotor blade 1 having a carbon fiber material 9 (shown in phantom outline) arranged on an inner side of the wind turbine rotor blade 1 and a heating element 11 on the outer side of the wind turbine rotor blade 1. At a small distance from the blade tip 3, near the leading edge 5, the second segment 8 of the carbon fiber material 9 and the blade tip end 14 of the heating element 11 overlap in an overlapping region 12. Electrical lines 10 are arranged at the blade root ends 13 of the heating element 11 and of the carbon fiber material 9. The electrical lines 10 lead to an energy source, which can, in particular, be arranged in a nacelle of the wind turbine. The energy source is connected to the rotor and the blade root end of the electrical line via a slip ring (not shown).

The first segment 7 of the carbon fiber material 9 is located on the inner side of one of the rotor blade half shells 2 and likewise runs substantially parallel to the leading edge 5.

Figure 5:
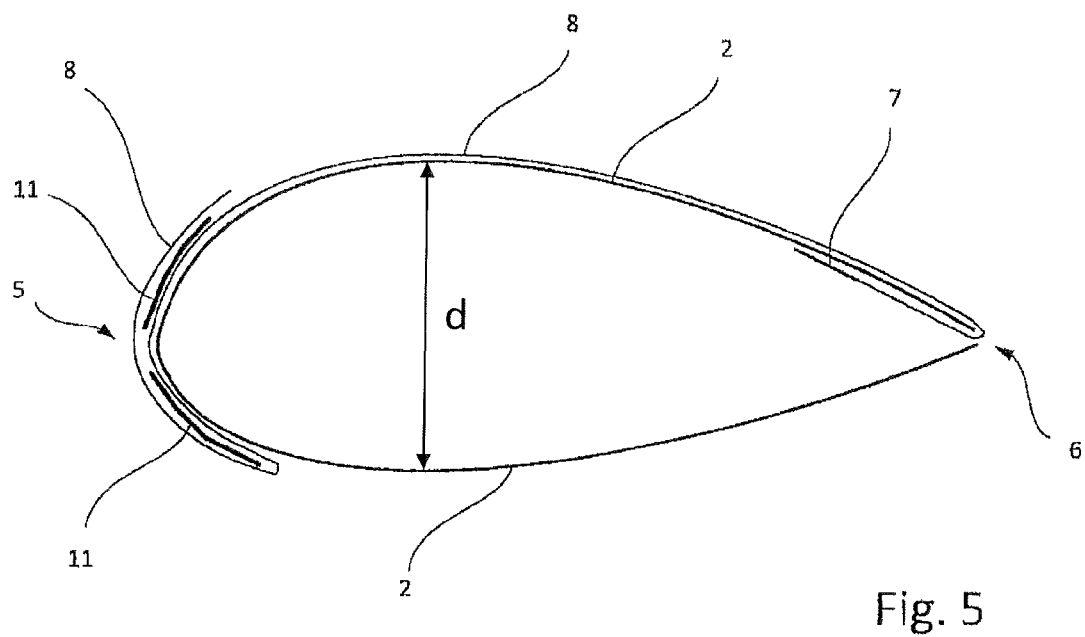
FIG. 5 shows a cross section along the plane denoted by A-A in FIG. 4.
Figure 6:
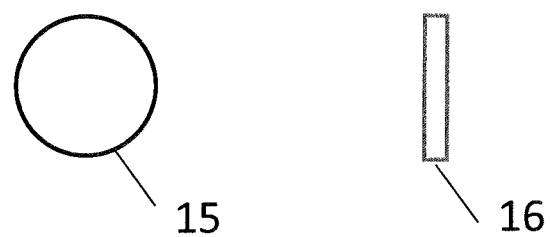
FIG. 6 shows two preferred embodiments of a metallic conductor.
Figure 7:
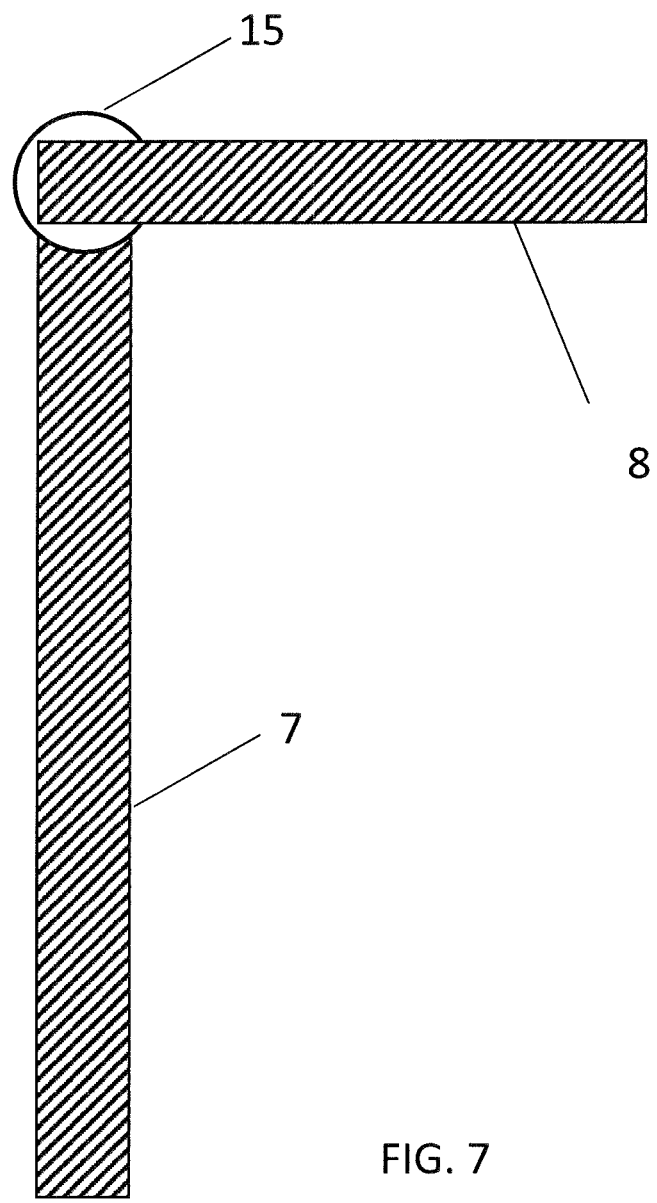
FIG. 7 shows metallic conductor 15 interconnecting the first segment and the second segment.

FIG. 5 shows a cross section along the plane A-A from FIG. 4 in a schematic representation. The two rotor blade half shells 2 of a fiber-reinforced plastics material, interconnected along the leading edge 5 and the trailing edge 6, can be seen. In the chosen cross section, the second segment 8 of the carbon fiber material 9 extends on the outer side of the wind turbine rotor blade 1. In the region of the leading edge 5, the second segment 8 is led around the heating element 11, so that it contacts the top side and underside thereof. Furthermore, the second segment 8 is redirected around a trailing edge 6 of one of the rotor blade half shells 2 and is led between the two rotor blade half shells into the interior of the wind turbine rotor blade 1, where it transitions into the first segment 7. The first segment 7 runs on the inner side of one of the rotor blade half shells 2.

The profile thickness d is the maximum thickness of the profile of the wind turbine rotor blade at a given cross-section.

It is understood that the foregoing description is that of the preferred embodiments of the invention and that various changes and modifications may be made thereto without departing from the spirit and scope of the invention as defined in the appended claims.

LIST OF DESIGNATIONS

1. Wind turbine rotor blade
2. Rotor blade half shell
3. Blade tip
4. Blade root
5. Leading edge
6. Trailing edge
7. First segment
8. Second segment
9. Carbon fiber material
10. Electrical line
11. Heating element
12. Overlapping region
13. Blade root end
14. Blade tip end

What is claimed is:

1. A wind turbine rotor blade comprising:
a first and a second rotor blade half shell each having an inner side and an outer side and which include a fiber reinforced plastics material;
said first and said second rotor blade half shells being mutually joined to conjointly define an inner side and an outer side of the rotor blade and to conjointly define a blade root and a blade tip;
an electrical heating element arranged on one of the outer sides of the rotor blade and having a blade root end and a blade tip end;
an electrical line leading to said blade root;
said blade tip end of said electrical heating element being connected via said electrical line;
said electrical line having a first segment arranged on said inner side of one of said rotor blade half shells and said first segment being formed of carbon fiber;
said electrical line having a second segment arranged on said outer side of the rotor blade;
said second segment of said electrical line being made of a carbon fiber material;
said second segment having a region which contacts said blade tip end of said heating element; and,
wherein said heating element has an under side and a top side; and, said second segment has a region which is guided around said heating element so as to contact said under side and said top side of said heating element.

2. The wind turbine rotor blade of claim 1, wherein said first segment of said electrical line extends toward the blade root up to a longitudinal position of the rotor blade; and, the rotor blade has a profile thickness of at least 20 cm at said longitudinal position.

3. The wind turbine rotor blade of claim 1, wherein said first segment and said second segment of said electrical line are formed by a continuous strip of material which runs from said inner side of the rotor blade to said outer side of said rotor blade.

4. The wind turbine rotor blade of claim 1, wherein said carbon fiber material is embedded in a plastic matrix.

5. The wind turbine rotor blade of claim 1 further comprising:
a protective layer; and,
at least one of said carbon fiber material and said heating element are coated with said protective layer.

6. The wind turbine rotor blade of claim 1, wherein at least one of said one of said first and said second segments of said electrical line is laminated on one of said first and said second rotor blade half shells.

7. The wind turbine rotor blade of claim 1, wherein at least one of said first and said second segments of said electrical line is adhesively bonded to one of said first and said second rotor blade half shells.

8. The wind turbine rotor blade of claim 1, wherein said heating element is a first heating element having a top side and a bottom side, the wind turbine rotor blade further comprising:
a second heating element having a top side and bottom side and arranged on said outer side of the rotor blade adjacent to said first heating element; and, said second segment of said electrical line being arranged so as to contact said top sides and said bottom sides of said first and said second heating elements.

9. The wind turbine rotor blade of claim 1, wherein said carbon fiber material has an ohmic resistance per length (a); said heating element has an ohmic resistance per length (b); and, said ohmic resistance per length (b) of said heating element is greater than said ohmic resistance per length (a) of said carbon fiber material.

10. The wind turbine rotor blade of claim 1 further comprising:
a metallic conductor interconnecting said first segment and said second segment;
said first and said second rotor blade half shells each having a wall; and,
said metallic conductor being arranged in one of said first rotor blade half shell wall and said second rotor blade half shell wall.

11. A wind turbine rotor blade comprising:
a first and a second rotor blade half shell each having an inner side and an outer side and which include a fiber reinforced plastics material;
said first and said second rotor blade half shells being mutually joined to conjointly define an inner side and an outer side of the rotor blade and to conjointly define a blade root and a blade tip;
an electrical heating element arranged on one of the outer sides of the rotor blade and having a blade root end and a blade tip end;
an electrical line leading to said blade root;
said blade tip end of said electrical heating element being connected via said electrical line;
said electrical line having a first segment arranged on said inner side of one of said rotor blade half shells and said first segment being formed of carbon fiber;
said electrical line having a second segment arranged on said outer side of the rotor blade;
said second segment of said electrical line being made of a carbon fiber material;
said second segment having a region which contacts said blade tip end of said heating element;

said first segment and said second segment of said electrical line being formed by a continuous strip of material which runs from said inner side of the rotor blade to said outer side of said rotor blade; and, wherein said second segment is redirected over an edge of one of said first and said second rotor blade half shells.

\* \* \* \* \*